Patented Apr. 4, 1950

2,503,078

UNITED STATES PATENT OFFICE 2,503,078

CYCLIC COMPOUNDS AND METHOD OF MAKING

Frederic B. Stilmar, Woodstown, and William S. Struve, Carneys Point, N. J., and Ralph N. Lulek, Silverside Heights, Del., assignors to the United States of America as represented by the United States Atomic Energy Commission No Drawing. Application December 20, 1945, Serial No. 636,261

12 Claims. (Cl. 260—648)

This invention relates to organic halogen derivatives and is especially concerned with new carbon compounds containing fluorine and chlorine.

It is an object of the invention to prepare new chlorofluoro derivatives of ethylcyclopentane. A further object of the invention is to prepare such derivatives having a high total halogen content and useful as intermediates for the manufacture of perhalogenated ethylcyclopentanes and other chlorofluoro compounds. Further objects of the invention will appear from the following description and illustrative examples.

The new compounds of the invention are monohydro-tridecafluoro-ethylcyclopentane and monohydro-chlorofluoro-ethylcyclopentanes, of the general molecular formula $C_7HF_xCl_{13-x}$, wherein $x$ is a positive integer not greater than 13 and preferably at least 10.

The compounds of the invention are colorless mobile liquids identifiable by their boiling points, molecular weights, and chlorine and fluorine analyses.

The monohydro-tridecafluoro-ethylcyclopentane distills, at 760 mm. mercury absolute pressure, at a temperature of about 64° C.

The monohydro-monochloro-dodecafluoro-ethylcyclopentanes boil, at standard pressure, at about 94° C.

The monohydro-dichloro-undecafluoro-ethylcyclopentanes boil, at standard pressure, between 110° and 120° C.

The monohydro-trichloro and tetrachloro compounds of the invention boil at progressively higher temperatures up to about 200° C.

The compounds of the invention, while possessing the stability inherent in highly halogenated organic compounds, contain replaceable hydrogen, which permits the production of compounds having various functional groups. Moreover the hydrogen atom activates an adjacent halogen atom so that the compounds are capable of undergoing dehalogenation and dehydrohalogenation in accordance with well-known principles to produce unsaturated compounds or condensation products. Thus they may be reacted in the presence of a copper condensing agent to form substantially higher-boiling chlorofluoro compounds in accordance with the process of U. S. Patent application Serial Number 559,230, filed October 18, 1944 by Frederic B. Stilmar.

The compounds of the present invention are of particular utility as intermediates for the manufacture of perhalogenated-ethylcyclopentanes. Thus by means of fluorinating agents capable of replacing the residual hydrogen atoms, for example, cobalt trifluoride, silver difluoride, or manganese trifluoride, monohydro-perfluoro-ethylcyclopentanes may be converted to perfluoro-ethylcyclopentane, and monohydro-monochloro-dodecafluoro-ethylcyclopentanes and monohydro-dichloro-undecafluoro-ethylcyclopentanes may be converted to the monochloro-tridecafluoro-ethylcyclopentanes and dichloro-dodecafluoro-ethylcyclopentanes, respectively. Similarly the monohydro-halogenated-ethylcyclopentanes of high chlorine content may be converted to the corresponding perhalogenated ethylcyclopentanes. The perhalogenated ethylcyclopentanes and the process of making them constitute the subject of our U. S. Patent application Serial Number 636,260 filed in the U. S. Patent Office on December 20, 1945 and entitled "Perhalogenated cyclic compounds and methods of making."

The compounds of the invention may be prepared by fluorination and cyclization of 2,4-dihydro-3-trichloroethenyl-perchloropentane $(C_7H_2Cl_{12})$ and its dehydrohalogenation products $(C_7HCl_{11}$ and $C_7Cl_{10})$. The fluorination may be conducted by means of fluorochlorides of pentavalent antimony or by antimony pentafluoride.

The 2,4-dihydro-3-trichlorethenyl-perchloropentane employed as a starting material may be obtained by condensing one mol of hexachloropropene with 2 mols of trichloroethene by the Prins reaction, using aluminum chloride as a condensing agent.

The dehydrohalogenation product, $C_7HCl_{11}$, may be obtained in crude form by condensing one mol of carbon tetrachloride with three mols of trichlorethene in an excess of trichlorethene as solvent at 80° C., using aluminum chloride as a condensing agent, and segregating the crude 7-carbon fraction by first washing with water to remove aluminum chloride and then distilling off the excess trichlorethene and those by-products boiling below about 120° C.

The fluorination of these products may be effected readily by treatment with anhydrous hydrogen fluoride in the presence of antimony pentachloride. The hydrogen fluoride reacts with antimony pentachloride to form fluorochlorides of pentavalent antimony and hydrogen chloride gas. Any of the antimony fluorohalides employed as fluorinating agents for replacing other organic halogen atoms can be employed to effect this replacement and simultaneous cyclization of the side-chain-substituted perchloropentane to form the halogenated ethylcyclopentanes of the invention. In general the antimony halides of the formula $SbCl_xF_{5-x}$, wherein $x$ has a value from 0 to 2 inclusive, are effective. Ring closure occurs during the fluorination with hydrogen fluoride or antimony pentafluoride to form the ethylcyclopentene or ethenylcyclopentane nucleus or both, and probably also the ethylcyclopentane nucleus, and products are formed having the molecular formulae, $C_7HCl_5F_8$, $C_7HCl_4F_9$, $C_7HCl_3F_{10}$, $C_7HCl_2F_{11}$, $C_7HClF_{12}$ and $C_7HF_{13}$.

For the preparation of halogenated ethylcyclopentanes of relatively high chlorine content, fluorination by means of hydrogen fluoride in the presence of pentavalent antimony halides as fluorination catalysts is preferred.

For the production of monohydro-perfluoro-ethylcyclopentane and monohydro-monochloro-dodecafluoro-ethylcyclopentanes, fluorination by means of antimony pentafluoride is particularly effective. It is therefore advantageous to prepare these products by a two-step process in which a part of the chlorine of the starting material is replaced by fluorine, employing hydrogen fluoride and an antimony halide catalyst, and these partially fluorinated products, comprising monohydro-dichloro - undecafluoro - ethylcyclopentane, monohydro-trichloro-decafluoro-ethylcyclopentane, monohydro-tetrachloro - nonafluoro-ethylcyclopentane and halogenated ethylcyclopentanes of still higher chlorine content, are fluorinated by means of antimony pentafluoride, employing from ½ to 2 molecules of $SbF_5$ per atom of residual chlorine to be replaced, to produce the monochloro and chlorine-free compounds.

The following examples illustrate the manufacture of the products of the present invention. Quantities are expressed as parts by weight.

*Example 1*

One thousand five hundred seventy five parts of a 2-carbon-side-chain dodecachloroheptene (prepared by condensing one mol of hexachloropropene with two mols of trichlorethylene and separating the product of 84–86° C. melting point) was mixed with 1000 parts of anhydrous $SbCl_5$ and 2700 parts of anhydrous HF and the mixture was heated to 150° C. in a steel autoclave. The pressure was kept at 400–450 pounds gauge by bleeding the excess gas through a brine-cooled dephlegmator. When no further evolution of gas occurred at 150° C., the autoclave charge was cooled to 20° C. and 2700 parts of anhydrous HF was added. The charge was then heated to 150° C. and the pressure was maintained at 400–450 pounds as before. When gas ceased to evolve, the charge was cooled to 50° C. and excess HF was distilled off through a dephlegmator maintained at a temperature of about 40° C. The fluorination product was then distilled from the autoclave at 10 mm. absolute pressure. The vapor temperature rose during the distillation to a final temperature of 170° C. Six hundred forty-seven parts of distillate was recovered. The distillate was washed with water, dried with calcium chloride, and redistilled at atmospheric pressure. Five hundred three parts of a yellow oil of boiling range 110–200° C. mostly boiling between 135° and 200° C. was obtained. The product had a chlorine content (28% Cl) corresponding to the average formula $C_7HCl_3F_{10}$; its boiling range indicates that it included $C_7HCl_4F_9$ and $C_7HCl_2F_{11}$ compounds as well as the trichloro compounds. Monohydro-dichloro - perfluoro - ethylcyclopentane may be obtained by collecting separately that portion of the distillate which had a normal boiling point within the range 110°–120° C. The distillation residue had an average composition corresponding to $C_7HCl_4F_9$. Both the distillate and residue were not completely saturated and were considered to include compounds of the general formulae $C_7HCl_2F_9$, $C_7HCl_3F_8$, and $C_7HCl_4F_7$.

A mixture of 60 parts of a fraction boiling from 118° to 200° C. obtained as described in the preceding paragraph, and 200 parts of anhydrous $SbF_5$ was heated at 180° C. for two hours in an aluminum-lined bomb. The mixture was then cooled and poured into a mixture of ice and dilute hydrochloric acid. The organic layer was separated, washed acid-free with water and fractionally distilled at atmospheric pressure. Twelve parts of a fraction boiling from 63.5° to 67° C. and thirteen parts of a fraction boiling from 90° to 100° C. were obtained. The major portion of the first fraction boiled between 64° and 65° C. and comprised $C_7HF_{13}$; the major part of the 90° to 100° fraction boiled between 92° and 95° C. and comprised $C_7HClF_{12}$.

*Example 2*

Three thousand eighty-five parts of the branched-chain seven-carbon product of condensation of three mols of trichlorethylene and one mol of carbon tetrachloride was fluorinated by two successive additions of anhydrous HF of 2700 parts each in the presence of 2000 parts of $SbCl_5$, in the manner described in Example 1. Upon redistillation of the product at atmospheric pressure, the following fractions were obtained:

| Vapor Temperature | Distillate |
|---|---|
| | Parts |
| Below 130° C | 63 |
| 130°–200° C | 881 |
| Above 200° C | 481 |

The fraction distilling from 130° to 200° C. is considered to comprise compounds of the general formulae $C_7HCl_2F_9$, $C_7HCl_3F_8$, $C_7HCl_4F_7$, $C_7HCl_2F_{11}$, $C_7HCl_3F_{10}$, and $C_7HCl_4F_9$.

A mixture of 60 parts of the 130°–200° C. fraction and 200 parts of $SbF_5$ was heated for two hours at 180° C. in an aluminum-lined bomb. Distillation of the crude organic product yielded 2 parts of a $C_7HF_{13}$ fraction boiling from 56° to 67° C. and 16 parts of a $C_7HClF_{12}$ fraction boiling from 90° to 100° C.

It will be understood that we intend to include variations and modifications of the invention and that the preceding examples are illustrations only and in no wise to be construed as limitations upon the invention, the scope of which is defined in the appended claims, wherein:

We claim:

1. As a new chemical compound, a monohydro-tridecafluoro-ethylcyclopentane having a boiling point of about 64° C.

2. As a new chemical compound, a monohydro-monochloro-dodecafluoro-ethylcyclopentane having a boiling point of about 94° C.

3. As a new chemical compound, a monohydro-dichloro-undecafluoro-ethylcyclopentane having a boiling point within the range 110°–120° C.

4. The process for making monohydro-perhaloethylcyclopentane of high fluorine content, which comprises reacting a compound of the group consisting of 2,4-dihydro-3-trichlorethenyl-perchloropentane and its dehydrohalogenation products, with hydrogen fluoride in the presence of a fluorochloride of pentavalent antimony at about 150° C.

and at 400–450 pounds gauge until evolution of gas ceases, and reacting the partially fluorinated organic reaction product at about 180° C. with antimony pentafluoride to replace at least all but two of the chlorine atoms in the molecule by fluorine atoms.

5. The process for making a monohydro-perfluoro-ethylcyclopentane, which comprises reacting a compound of the group consisting of 2,4-dihydro-3-trichlorethenyl-perchloropentane and its dehydrohalogenation products, with hydrogen fluoride in the presence of a fluorochloride of pentavalent antimony at about 150° C. and at 400–450 pounds gauge until evolution of gas ceases, reacting the partially fluorinated organic reaction product at about 180° C. with between ½ and 2 molecules of antimony pentafluoride for each chlorine atom to be replaced, and separating from the reaction product a fraction having a normal boiling point of about 64° C.

6. The process for making a monohydro-monochloro-perfluoro-ethylcyclopentane, which comprises reacting a compound of the group consisting of 2,4-dihydro-3-trichlorethenyl-perchloropentane and its dehydrohalogenation products, with hydrogen fluoride in the presence of a fluorochloride of pentavalent antimony at about 150° C. and at 400–450 pounds gauge until evolution of gas ceases, reacting the partially fluorinated organic reaction product at about 180° C. with between ½ and 2 molecules of antimony pentafluoride for each chlorine atom to be replaced, and separating from the reaction product a fraction having a normal boiling point of about 94° C.

7. The process for making a monohydro-dichloro-perfluoro-ethylcyclopentane, which comprises reacting a compound of the group consisting of 2,4-dihydro-3-trichlorethenyl-perchloropentane and its dehydrohalogenation products, with hydrogen fluoride in the presence of a fluorochloride of pentavalent antimony at about 150° C. and at 400–450 pounds gauge until evolution of gas ceases, and separating from the reaction product a fraction having a normal boiling point of about 110–120° C.

8. The process for making a monohydro-perfluoro-ethylcyclopentane, which comprises reacting 2,4-dihydro-3-trichlorethenyl - perchloropentane with hydrogen fluoride in the presence of a fluorochloride of pentavalent antimony at about 150° C. and at 400–450 pounds gauge until evolution of gas ceases, reacting the fluorinated organic reaction product at about 180° C. with between ½ and 2 molecules of antimony pentafluoride for each chlorine atom to be replaced, and separating from the reaction product a fraction having a normal boiling point of about 64° C.

9. The process for making a monohydro-monochloro-perfluoro-ethylcyclopentane, which comprises reacting 2,4-dihydro-3-trichlorethenyl-perchloropentane with hydrogen fluoride in the presence of a fluorochloride of pentavalent antimony at about 150° C. and at 400–450 pounds gauge until evolution of gas ceases, reacting the partially fluorinated organic reaction product at about 180° C. with between ½ and 2 molecules of antimony pentafluoride for each chlorine atom to be replaced, and separating from the reaction product a fraction having a normal boiling point of about 94° C.

10. The process for making a monohydro-dichloro-perfluoro-ethycyclopentane, which comprises reacting 2,4-dihydro-3-trichlorethenyl-perchloropentane with hydrogen fluoride in the presence of a fluorochloride of pentavalent antimony at about 150° C. and at 400–450 pounds gauge until evolution of gas ceases, and separating from the reaction product a fraction having a normal boiling point of about 110–120° C.

11. The process for making a monohydro-perhalo-ethylcyclopentane which comprises reacting a compound of the group consisting of 2,4-dihydro-3-trichlorethenyl-perchloropentane and its dehydrohalogenation products with hydrogen fluoride in the presence of a halide of pentavalent antimony at about 150° C. and at 400–450 pounds gauge until gas is no longer evolved.

12. As new chemical compounds, monohydro-perhalogenated ethyl cyclopentanes selected from the group consisting of a monohydro-tridecafluoro-ethylcyclopentane having a boiling point of about 64° C., a monohydro-monochloro-dodecafluoro-ethylcyclopentane having a boiling point of about 94° C., and a monohydro-dichloro-undecafluoro-ethylcyclopentane having a boiling point within the range 110–120° C.

FREDERIC B. STILMAR.
WILLIAM S. STRUVE.
RALPH N. LULEK.

REFERENCES CITED

The following references are of record in the file of this patent:

UNITED STATES PATENTS

| Number | Name | Date |
| --- | --- | --- |
| 2,005,708 | Daudt et al. | June 18, 1935 |